United States Patent [19]

Herczog

[11] 4,347,295
[45] Aug. 31, 1982

[54] SEALING GLASSES FOR ELECTROCHEMICAL, ELECTRICAL, ELECTRONIC, AND OPTICAL APPLICATIONS

[75] Inventor: Andrew Herczog, Hammondsport, N.Y.

[73] Assignee: Corning Glass Works, Corning, N.Y.

[21] Appl. No.: 294,472

[22] Filed: Aug. 20, 1981

Related U.S. Application Data

[62] Division of Ser. No. 195,377, Oct. 9, 1980, Pat. No. 4,311,772.

[51] Int. Cl.³ ............................................. H01M 6/18
[52] U.S. Cl. .................................... 429/193; 429/104; 429/185; 501/11
[58] Field of Search ............... 429/193, 191, 104, 185, 429/174; 106/47 R

[56] References Cited

U.S. PATENT DOCUMENTS

| | | | |
|---|---|---|---|
| 3,679,480 | 7/1972 | Brown et al. | 429/104 |
| 3,829,331 | 8/1974 | Tsang | 429/104 |
| 3,877,995 | 4/1975 | Levine et al. | 429/104 |
| 4,105,834 | 8/1978 | Baker et al. | 429/104 |
| 4,219,613 | 8/1980 | Anand et al. | 429/104 |

Primary Examiner—Charles F. LeFevour
Attorney, Agent, or Firm—Clinton S. Janes, Jr.

[57] ABSTRACT

This invention is directed to the production of sealing glasses capable of forming strong, non-porous seals with glasses containing at least 10% by weight of an alkali metal oxide such as are used in the fabrication of the glass membranes utilized in sodium-sulfur and potassium-sulfur batteries. The inventive seals require an interdiffusion of ions to occur between the sealing glass and the glass being sealed. Glasses presently employed as membrane glasses for such batteries have base compositions within the $Na_2O$—$B_2O_3$ and $K_2O$—$B_2O_3$ systems. The inventive sealing glasses consist essentially, expressed in mole percent on the oxide basis, of about 3–30% $R_2O$ and 60–95% $B_2O_3$, wherein $R_2O$ consists of $K_2O$, $Rb_2O$, $Cs_2O$, and mixtures thereof and, optionally, $Al_2O_3$ is substituted for up to one-half the $B_2O_3$ content on a molar basis. The seals contemplate the exchange of large alkali metal ions from the sealing glass for the smaller alkali metal ions of the membrane glass.

6 Claims, 2 Drawing Figures

SEALING GLASSES FOR ELECTROCHEMICAL, ELECTRICAL, ELECTRONIC, AND OPTICAL APPLICATIONS

This is a division, of application Ser. No. 195,377, filed Oct. 9, 1980 now U.S. Pat. No. 4,311,772.

BACKGROUND OF THE INVENTION

The glasses of the present invention are designed for making seals to vitreous materials of high alkali metal content such as are required for certain electrochemical, electrical, electronic, and optical applications. One example of an electrochemical application is the use of sodium ion-conducting glass membranes or electrolytes in one form of sodium-sulfur, high efficiency battery. Such glasses contain a high content of $Na_2O$ and require low temperature, non-distorting seals. In the electrical, electronic, and optical areas, there are similar requirements for sealing to flat soda lime glass substrates utilized for circuit boards or as transparent enclosures for display systems, microcircuits, magnetic or optical storage matrices, solar energy conversion devices, etc.

An application of particular interest for the present inventive glasses is for sealing to the sodium ion-conducting glasses employed as solid electrolytes in sodium-sulfur batteries. In brief, such a battery comprises a liquid anode, a liquid or paste-like cathode, and a solid electrolyte-separator or membrane which is selectively permeable and which separates the anode and cathode. The anode consists of a molten alkali metal, an alkali metal amalgam, or a solution. The cathode consists of liquid sulfur and sulfides of the anode metal. The membrane is selectively permeable to the cations of the anode metal without transmitting, to any appreciable extent, other ions, neutral molecules, or electrons from either the anode or cathode. The anode, cathode, and membrane elements are customarily positioned within a liquid and vapor tight case.

Commonly, liquid sodium has comprised the anode, a liquid sulfur-sodium sulfide mixture, e.g., a sodium polysulfide, has comprised the cathode, and the membrane has been formed from a sodium ion conductive ceramic, such as $\beta$-alumina, or a glass. The use of sodium sulfide dissolved in, or in admixture with, liquid sulfur as the cathode has been found to be particularly useful since those two components form a wide range of mixtures that become liquid at relatively low temperatures, i.e., between about 235°-285° C., and demonstrate high electrical conductivity over a certain range of composition.

Sodium and sulfur are readily available and relatively inexpensive, when compared with lead. Furthermore, batteries made therefrom yield several times more energy per unit weight than the active materials of lead and lead oxide in the conventional lead-acid battery. Accordingly, the sodium-sulfur battery has the potential to replace the lead-acid battery in many applications.

As described in U.S. Pat. No. 3,679,480, one construction of an alkali metal-sulfur battery contemplates an electrolyte-separator (membrane) in the form of a bundle of very thin, hollow glass fibers (capillaries) sealed with open end into a common header. The capillaries are closed at the other end which is immersed into the molten alkali metal sulfide contained in the cathode chamber and are filled with the liquid alkali metal and in open communication with the anode compartment. The capillaries are prepared from a sodium ion-conducting glass. The sealing glass completes the separation between the anodic and cathodic liquids while mechanically holding the capillaries together in a bundle.

In order to obtain a good seal in that application, the sealing glass must fulfill the following three general requirements:

(1) the softening point of the sealing glass must be considerably below the strain point of the capillary glass to obtain a leak tight seal without thermal deformation of the capillaries during the sealing process;

(2) the coefficients of thermal expansion of the sealing glass and the capillaries should be well matched to insure a relatively stress-free seal; and (3) the seal must be strongly resistant to attack by liquid alkali metal and alkali metal sulfide during battery operation.

A further property most desirable in the sealing glass is an annealing point slightly above the operating temperature of the battery ($\sim 300°$ C.) to insure seal stability against deformation caused by internal pressure differences occurring during battery operation.

In conventional glass sealing, the sealing glass has to be heated to a temperature at which it is sufficiently fluid to wet the glass to which it is to be sealed in order to form a strong bond to it. Either one of two general mechanisms is involved in forming a bond: (1) simple surface adhesion; or (2) the formation of a common boundary layer through a diffusion process. In order to achieve the fluidity necessary for good wetting and for a tight bond, the sealing glass must be heated well above the softening point thereof, i.e., to a temperature at which the glass manifests a viscosity less than $10^7$ poises and, preferably, as low as $10^2$-$10^4$ poises. This practice is beset with several disadvantages, for example:

(a) the fluid sealing glass flows out of place or deforms unless it is contained and containment is not feasible in numerous applications;

(b) the glass to which the sealing glass is bonded must have a higher annealing temperature or strain point than the sealing temperature, i.e., the temperature at which the sealing glass has to be quite fluid, this factor making it necessary to have a large difference in viscosities existing between the two glasses which circumstance, in turn, eliminates many potentially useful combinations of glasses having but small differences in viscosities; and (c) the depth of the boundary layer between the two glasses is extremely difficult to control.

In general, a boundary layer will be formed which must be very thin and uniform in depth so as to minimize stresses which may be developed therein if the thermal expansion of the boundary layer does not closely match the thermal expansions of the two glasses being sealed together.

Table I reports the composition and several physical properties for a glass which has been employed as the membrane for a sodium-sulfur storage battery and a sealing glass that has been used therewith. The glass compositions are tabulated in terms of weight percent on the oxide basis as calculated from the batch. The coefficient of thermal expansion (Expansion) is reported for the range of room temperature (R.T.), commonly about 25° C., to 250° C.

TABLE I

|        | Membrane | Sealing Glass |
|--------|----------|---------------|
| $Na_2O$ | 27.8    | 4.5           |
| $B_2O_3$ | 62.6   | 92.7          |

TABLE I-continued

| | Membrane | Sealing Glass |
|---|---|---|
| $SiO_2$ | 5.4 | 2.8 |
| NaCl | 4.2 | — |
| Expansion ($\times 10^{-7}/°C.$) | 124 | 126 |
| Softening Point (°C.) | 532 | 396 |
| Annealing Point (°C.) | 456 | 280 |
| Strain Point (°C.) | 429 | 248 |

Those two glasses satisfy the three general requirements listed above for such glasses. It has been observed, nevertheless, that battery failure occurs after a relatively short period of operation and is usually the result of breakage of the membrane-capillaries at the interface with the sealing glass. Customarily, a sealing temperature of about 380° C. was utilized with that set of glasses but that temperature produced seals of only marginal quality, particularly in the case of larger (>1") seal areas, with regard to leak tightness. However, it was noted that, where sealing temperatures in the neighborhood of 390°-400° C. were employed to improve leak tightness, many capillaries exhibited high brittleness at the seal. These observations led to the conclusion that either prolonged use at battery operating temperatures (~300° C.) or excessive sealing temperatures cause some unexplained interaction between the sealing glass and the membrane glass resulting in mechanical weakness and eventual failure.

OBJECTIVES OF THE INVENTION

The primary objective of the instant invention is to provide a seal that can be made between glass bodies at relatively high viscosities, viz., within the range of about $10^7$-$10^{13}$ poises, i.e., between about the annealing point and softening point of the sealing glass, but below the strain point of the glass to be sealed, such that undesired deformation through viscous flow can be avoided.

A complementary objective of the present invention is to provide operable compositions for glass bodies that can be sealed together at such high viscosities.

A specific objective of the subject invention is to provide compositions for use as glass capillaries in sodium-sulfur batteries and sealing glasses therefor which can be sealed together at high viscosities.

SUMMARY OF THE INVENTION

Those objectives can best be attained where the glass bodies to be sealed together have closely-matched coefficients of thermal expansion and wherein there is a necessary minimum interdiffusion occurring between the two glasses to obtain a hermetic seal therebetween. Hence, for example, a sound seal can be prepared between any pair of glass bodies wherein the coefficient of thermal expansion of one glass closely approximates that of the other and wherein each glass contains either alkali metal or hydrogen (or hydronium) ions, provided that there is a difference in the type of ions present in each glass. To illustrate, a $Na^+$ ion-containing glass can be sealed to a $K^+$ ion-containing glass and, if desired, the alkali metal ions can be mixed in each glass, i.e., a glass may contain both $Na^+$ amd $K^+$ ions provided that the $Na^+$:$K^+$ ion ratios in the two compositions are dissimilar.

Glass compositions containing two or more alkali metal ions (mixed alkali glass) exhibit a number of properties of interest for accomplishing the primary objective of the instant invention. For example, if one alkali metal is replaced by another in a glass composition, certain electrical and physical characteristics will demonstrate a maximum (electrical resistivity, e.g.) or a minimum (viscosity, e.g.) at 50% replacement where the number of the two alkali metal atoms is equal. This "mixed alkali effect" of lowering viscosity can be utilized very advantageously in sealing an alkali metal-containing glass to another alkali metal-containing glass of otherwise like composition except for the identity of the alkali metal. The magnitude of the effect is dependent upon the quantity of alkali metal present which, desirably, will be at least 10 cationic percent of the composition. Of course, it will be apparent that other compositional variations can also be utilized to secure a lowering of viscosity which may be demanded for sealing glass applications.

A good seal demands that hermeticity be achieved between the glasses with a minimum of residual mechanical stress. In order to minimize stress, the coefficient of thermal expansion of each glass must closely match and the reaction layer at the interface between the two ought to be as thin and as uniform in thickness as is possible. These desiderata can only be attained in a sealing process where a good initial contact between the parts to be sealed is achieved and the sealing time and temperature are well controlled and uniform throughout the area of the seal. In those instances where perfect mating of surfaces to insure good initial contact cannot be obtained, the desired low temperature sealing, i.e., at glass viscosities of $10^6$ poises and higher, can only be accomplished utilizing external pressure to establish good contact. Such pressure can be applied via exterior force or by surface tension such as occurs in the case of frit sealing where the sealing glass is applied as a dispersion containing fine particles which sinter together to form the seal.

The inventive method is especially applicable for sealing the thousands of fine capillary tubes utilized in a sodium-sulfur battery of the type described in U.S. Pat. No. 3,476,602, supra. Because the glass compositions most prevalently used for the capillaries have been from the sodium borate field, seals grounded in an alkali metal ion exchange reaction are particularly useful. Those glasses exhibit a rather low annealing temperature (~450° C.) and the seal bonding them together must be firm at 300° C., the operating temperature of the battery. Stated in another way, the sealing glass ought to demonstrate a viscosity of at least about $10^{15}$ poises at 300° C. but must be soft enough to permit sealing below 450° C. These requirements render it difficult, if not impossible, to compound a glass displaying viscosity temperature characteristics necessary for such application if seals are to be made at low glass viscosities as taught in the prior art, without even considering problems of deformation or containment.

In order to better understand the above-described breakage problem of the capillaries in the sodium-sulfur batteries, a series of glasses was prepared having compositions, in weight percent on the oxide basis, intermediate the sealing glass and membrane (capillary) glass recited in Table I above, and those glasses are listed below in Table II. In like manner to the glasses listed in Table I, the coefficients of thermal expansion were measured over the range of R.T. to 250° C.

TABLE II

| | A | B | C | D | D |
|---|---|---|---|---|---|
| $Na_2O$ | 7.4 | 12.0 | 15.0 | 19.7 | 23.0 |
| $B_2O_3$ | 88.6 | 83.0 | 78.9 | 73.0 | 68.5 |

TABLE II-continued

| | A | B | C | D | D |
|---|---|---|---|---|---|
| SiO$_2$ | 3.2 | 3.6 | 4.0 | 4.5 | 5.0 |
| NaCl | 0.7 | 1.4 | 2.1 | 2.8 | 3.5 |
| Expansion ($\times 10^{-7}$/°C.) | 95 | 70 | 62 | 75 | 110 |
| Softening Point (°C.) | 440 | 485 | 520 | 538 | 540 |

Inasmuch as the Na$_2$O content was the principal variable, the content thereof has been employed as the abscissa of the appended graph, FIG. 1, wherein the coefficients of thermal expansion and the softening points are plotted for all the compositions (curves a and b, respectively). Curve a illustrates that the coefficients of thermal expansion of the sealing glass and the capillary glass are substantially identical but each of the intermediate glasses has a lower coefficient. Although this phenomenon has not been rigorously explained, it is believed to be caused via variations of coordination of boron atoms with Na$_2$O content, which has been termed the "boron anomaly", as reported by Briscoe and Warren, *Journal American Ceramic Society*, 21, 287 (1936). This phenomenon is also expressed by the tendency to phase separate which is evidenced in all compositions containing about 5–25% Na$_2$O [Shaw and Uhlman, *Journal American Ceramic Society*, 51, 379 (1968)].

Whatever the explanation, it is evident from the presence of the minimum in the coefficient of thermal expansion values that fracture of the capillaries will occur through thermo-mechanical stress if Na$^+$ ions are removed from the capillary glass. This action can take place through sodium ion migration by exchange with hydrogen ions, either through the contact with the low Na$_2$O content sealing glass of higher hydroxyl ion content, or by the presence of crystalline interfacial material occasionally formed by devitrification, hydration, or some process-related contamination on the sealing glass surface. Curve b demonstrates that the loss of some Na$_2$O from the capillary glass can yield glasses which have viscosities as high, if not higher, than the capillary glass such that stresses cannot be annealed out at the battery operation temperature of 300° C. As was observed previously, Na$^+$ ion migration may occur when the temperature is relatively high as, for example, during the sealing process or, if a long period of time is allowed, during the operating life of the battery, especially where spots of local over-temperature develop. Hence, the loss of Na$^+$ ions from the capillary glass presents a very real problem with regard to the life of the battery.

The present invention alleviates that problem through the use of alkali metal borate sealing glasses exhibiting coefficients of thermal expansion closely compatible with those of the capillary glasses and containing alkali metal ions other than Na$^+$ ions, such that an interdiffusion by exchange of alkali metal ions can take place between the capillary glass and the sealing glass, thereby alleviating or eliminating other undesirable processes.

FIG. 2 schematically represents the changes in the coefficient of thermal expansion (R.T.-250° C.) exhibited by K$_2$O-B$_2$O$_3$ and Cs$_2$O-B$_2$O$_3$ containing systems where the K$_2$O and Cs$_2$O are varied between 5–25% on the molar basis, those values representing the alkali metal oxide contents of the sealing glass and capillary glass, respectively. The minimum in the coefficient of thermal expansion characteristic of the sodium borate glasses leading to capillary brittleness was discussed above and demonstrated in FIG. 1. FIG. 2 illustrates that the minimum in the K$_2$O-B$_2$O$_3$ glass system is much less pronounced and is essentially absent in the Cs$_2$O-B$_2$O$_3$ glasses. The curve generated by the changes in coefficients of thermal expansion exhibited by glasses having compositions within the Rb$_2$O-B$_2$O$_3$ system falls between the two curves of FIG. 2.

Accordingly, the exchange of Na$^+$ ions via interdiffusion from the capillary glass, with K$^+$, Rb$^+$, and/or Cs$^+$ ions from a borate-based sealing glass containing such ions, can take place with relatively little variation in the coefficient of thermal expansion between the sealing glass and capillary glass. In general, glass compositions containing at least two different alkali metal ions exhibit greater stability with respect to phase separation and/or devitrification and manifest higher electrical resistivity (the "mixed alkali effect"). In summary, then, a tight, mechanically-stable seal can be made between two glasses containing different alkali metal ions.

Accordingly, glasses operable as sealing glasses in the present invention will have base compositions within the general R$_2$O-B$_2$O$_3$ system and consist essentially, expressed in mole percent on the oxide basis as calculated from the batch, of about 3–30% R$_2$O and 60–95% B$_2$O$_3$, wherein R$_2$O consists of K$_2$O, Rb$_2$O, Cs$_2$O, and mixtures thereof and wherein, optionally, Al$_2$O$_3$ may be substituted for up to one-half of the B$_2$O$_3$ content on a molar basis. Minor additions of compatible materials, e.g., SiO$_2$, Na$_2$O, alkaline earth metal oxides, Cl, and F, may be included in the base composition to improve the melting and forming qualities of the glass and/or to modify the physical properties thereof. Moreover, the presence of Na$_2$O in the composition is important. The molar ratio R$_2$O:Na$_2$O determines the viscosity of the glass whereas the total alkali metal oxide content (R$_2$O + Na$_2$O) governs the thermal expansion of the glass. Based upon those two factors, the Na$_2$O level ranges about 0–20 mole percent. The content of SiO$_2$ will generally not exceed 10%, the total of the alkaline earth metal oxides will not exceed 5%, and individual amounts of Cl and F will commonly be less than 5%. Nevertheless, the total of all such extraneous additions will not exceed 30 mole percent and, most desirably, will be held below 20%. Stated in another manner, the sum of R$_2$O + B$_2$O$_3$ will constitute at least 70% of the total composition.

From thermal expansion considerations, a Cs$_2$O-containing glass would be the most desirable. Unfortunately, however, the cost of cesium-containing batch materials is very high. Rubidium-containing materials suitable as batch ingredients are even more costly. Consequently, practical considerations have dictated the preferred compositions to hold the Cs$_2$O content at a low level and to incorporate other alkali metal oxides, such as K$_2$O in addition to Cs$_2$O or to Na$_2$O. Where the glasses are to be employed in the sodium-sulfur battery, the total R$_2$O content will be limited to about 20% and Cs$_2$O-Na$_2$O combinations are preferred because of the low diffusion coefficient of the cesium ion. This factor permits the formation of a very thin interdiffusion layer between the glasses which, as has been explained above, is highly desirable. Potassium ion-containing glasses are preferred for such non-battery applications as sealing to conventional soda lime glass. Such glasses, when containing cesium, are also useful in making seals with components of potassium-sulfur batteries (as opposed to sodium-sulfur batteries). The use of K+ ion-containing sealing glasses in sodium-sulfur batteries may lead to an exchange reaction taking place between K+ ions in the sealing glass and Na+ ions in the sulfur catholyte which, in turn, can result in an increase in electrical resistance in the sodium ion-containing capillary glass through the mixed alkali effect discussed above. Inasmuch as the sealing glass ought to exhibit a viscosity of at least $10^{15}$ poises at 300° C., or stated another way, a strain point above 300° C., the softening points thereof will generally be in excess of 400° C. Nevertheless, the sealing will be undertaken at temperatures wherein the sealing glass will manifest a viscosity between about $10^7$-$10^{13}$ poises, i.e., between about the annealing point and softening point thereof.

Prior Art

U.S. Pat. Nos. 3,829,331 and 3,877,995 disclose, respectively, glasses having compositions in the $Na_2O$-$B_2O_3$-halide system and $K_2O$-$B_2O_3$-halide system which were designed for use as membranes in sodium-sulfur and potassium-sulfur batteries, respectively. There is no discussion of sealing glasses to be used with those compositions and, more importantly, that the sealing glass should contain alkali metal oxides other than the $Na_2O$ or $K_2O$ in the membrane glass such that an interdiffusion of ions will occur during the sealing operation, thereby resulting in a firm seal.

DESCRIPTION OF THE PREFERRED EMBODIMENTS

Figure 1:
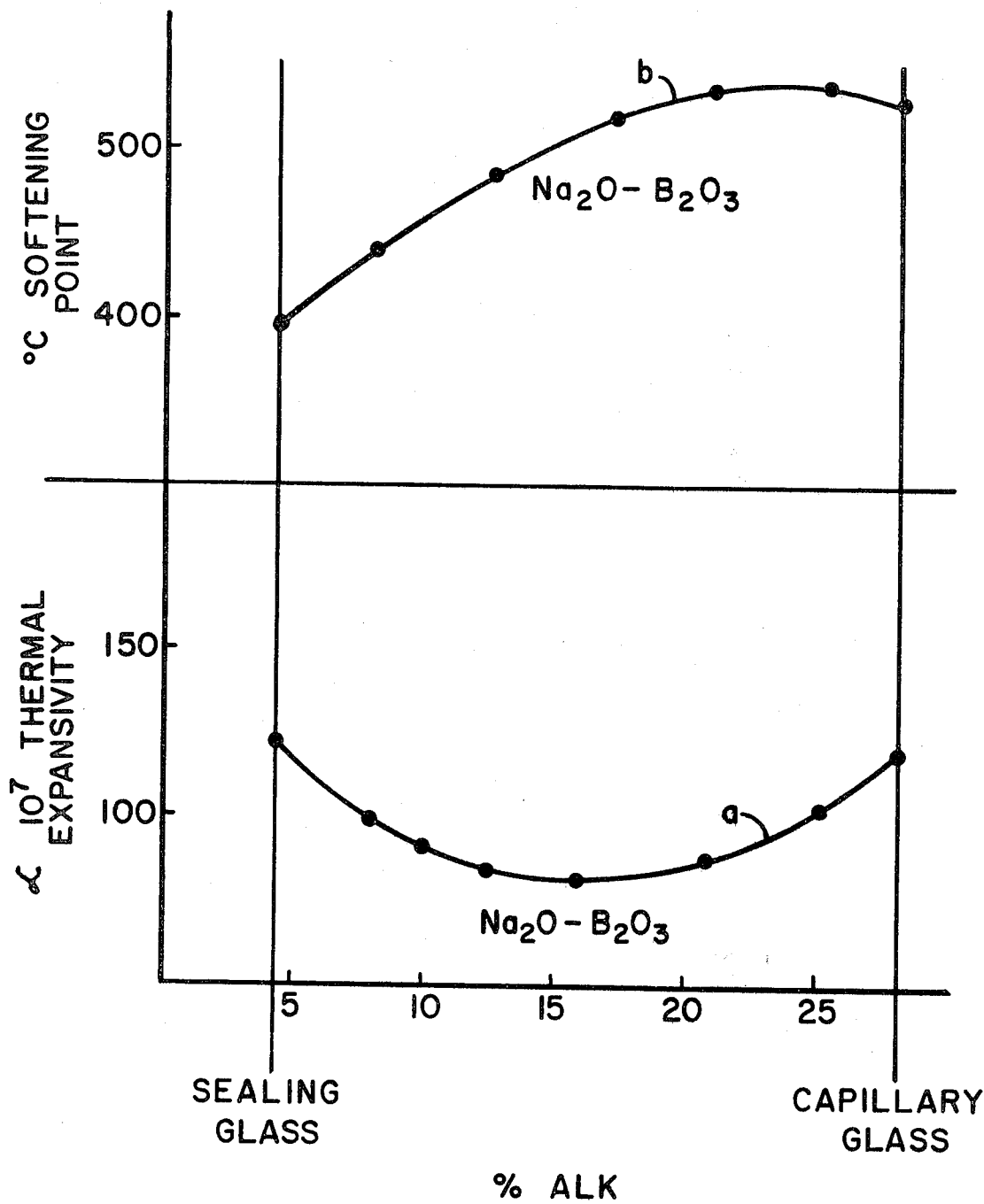
FIG. 1 graphically represents the softening points and coefficients of thermal expansion of several sodium borate-based glass compositions.
Figure 2:
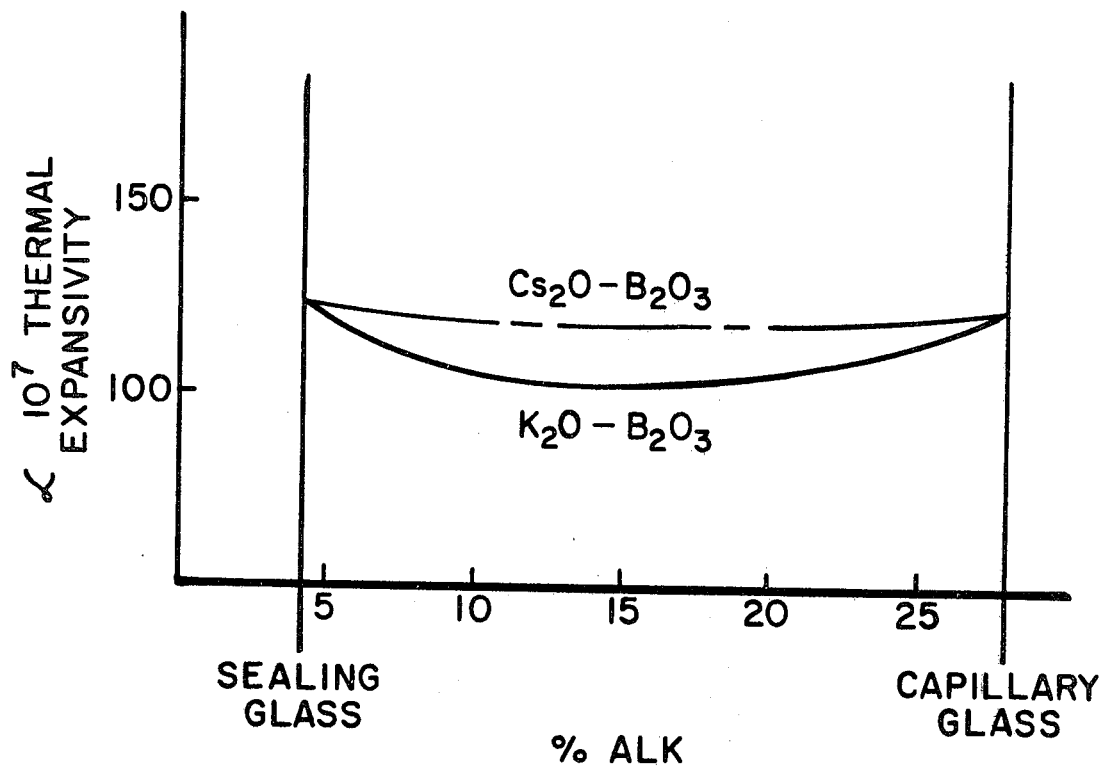
FIG. 2 graphically portrays the coefficients of thermal expansion of a series of $K_2O$-$B_2O_3$ and $Cs_2O$-$B_2O_3$ glass compositions.

Table III reports several glasses, expressed in parts by weight on the oxide basis as calculated from the batch, illustrating the parameters of sealing glasses for use with alkali metal borate-type membrane glasses such as are described in U.S. Pat. Nos. 3,829,331 and 3,877,995, supra. Because it is not known with which cation(s) the halides are associated, they are simply recorded in terms of the batch materials employed. The actual batch ingredients utilized may comprise any materials, either oxides or other compounds, which, when melted together with the other components, will be converted to the desired oxide in the proper proportions. The tabulated glasses represent laboratory runs but it will be appreciated that the compositions could be melted in large commercial glassmaking facilities. Inasmuch as the sum of the individual components totals or approximately totals 100, for all practical purposes the constituents may be considered to be present in terms of weight percent.

The batch ingredients were compounded, ballmilled together to assist in achieving a more homogeneous melt, and deposited into platinum crucibles. The crucibles were introduced into a furnace operating at 1000° C., maintained therein for two hours with stirring, and then poured into slabs having dimensions of about 5 mm thickness which were immediately transferred to an annealer.

Table III also lists the softening point (S.P.) in °C. and the coefficient of thermal expansion (Exp.) over the range of R.T. to 250° C. as determined in accordance with methods conventional in the glass art. The expansion coefficients are tabulated in terms of $\times 10^{-7}$/°C.

Table IIIA reports the compositions of Table III in terms of mole percent as calculated to the nearest 0.1%.

TABLE III

|  | 1 | 2 | 3 | 4 | 5 |
|---|---|---|---|---|---|
| $Na_2O$ | 1.7 | — | — | 16.0 | 8.7 |
| $Cs_2O$ | 13.2 | 30.0 | 15.0 | 28.0 | 45.5 |
| $B_2O_3$ | 82.6 | 67.9 | 82.4 | 50.1 | 41.8 |
| $SiO_2$ | 2.5 | 2.1 | 2.6 | 4.3 | 2.7 |
| NaCl | — | — | — | 1.6 | 1.3 |
| S.P. | 398 | 412 | 384 | 500 | 469 |
| Exp. | 136 | 136 | 141 | 125 | 136 |

|  | 6 | 7 | 8 | 9 | 10 | 11 |
|---|---|---|---|---|---|---|
| $Na_2O$ | — | 1.8 | 0.5 | 21.3 | 17.1 | 13.0 |
| $K_2O$ | 2.7 | 2.7 | 4.5 | 8.7 | 14.2 | 19.5 |
| $B_2O_3$ | 92.0 | 90.2 | 89.7 | 63.5 | 62.2 | 61.0 |
| $SiO_2$ | 2.8 | 2.8 | 2.8 | 4.0 | 4.0 | 4.0 |
| NaF | 2.5 | 2.5 | 2.5 | 2.5 | 2.5 | 2.5 |
| S.P. | 378 | 395 | 400 | 504 | 492 | 481 |
| Exp. | 126 | 136 | 133 | 126 | 126 | 136 |

TABLE IIIA

|  | 1 | 2 | 3 | 4 | 5 |
|---|---|---|---|---|---|
| $Na_2O$ | 2.1 | — | — | 21.9 | 14.5 |
| $Cs_2O$ | 3.6 | 9.5 | 4.2 | 8.5 | 16.7 |
| $B_2O_3$ | 91.1 | 87.3 | 92.5 | 61.2 | 61.9 |
| $SiO_2$ | 3.2 | 3.1 | 3.4 | 6.1 | 7.5 |
| NaCl | — | — | — | 2.3 | 2.3 |

|  | 6 | 7 | 8 | 9 | 10 | 11 |
|---|---|---|---|---|---|---|
| $Na_2O$ | — | 2.0 | 0.6 | 23.3 | 19.1 | 14.8 |
| $K_2O$ | 2.0 | 2.0 | 3.3 | 6.3 | 10.4 | 14.6 |
| $B_2O_3$ | 90.7 | 88.8 | 88.8 | 61.9 | 61.8 | 61.7 |
| $SiO_2$ | 3.2 | 3.2 | 3.2 | 4.5 | 4.6 | 4.2 |
| NaF | 4.1 | 4.1 | 4.1 | 4.0 | 4.1 | 4.2 |

To illustrate differences in sealing behavior demonstrated by the inventive glasses when compared with the sealing glass reported above in Table I, polished pieces of the sealing glass and the membrane (capillary) glass were heated to 450° C. in contact with each other under light pressure. The sealing glass listed in Table I fell away from the membrane glass upon cooling and an analysis of the surface of the sealing glass determined that the $Na_2O$ content thereof was unchanged. Attempts to fuse the two glasses together in a flame produced the same negative result in a more violent fashion. In contrast, the inventive glasses formed strong, non-porous seals with the membrane glass.

It will be appreciated that minor adjustments in glass composition are contemplated to minimize residual stress in the seal at any particular use temperature. Closely matching the coefficients of thermal expansion of the glasses involved is, obviously, a major step in that direction, but that action may not necessarily be adequate. This circumstance is partially the result of structural variations in borate glasses which are dependent upon the thermal history experienced by the glass during its formation, but it may also be caused by the method utilized in the sealing operation as well as such factors as impurities picked up during the sealing process.

In accordance with the above description, it is possible to formulate sealing glass compositions for use with modified or basically different capillary glass compositions so long as such have a sufficiently high content (at least 10% by weight) of an alkali metal oxide different from an alkali metal oxide in the sealing glass to be responsive to the ion interactions discussed above. For example, the inventive sealing method is operable with conventional soda lime glasses, such as are utilized for windows, which contain about 15% by weight $Na_2O$.

Seals made in accordance with the inventive method evidence the following advantages when compared with the use of sealing and membrane glasses containing the same alkali metal:

(a) the seals are more stable against phase separation;

(b) the seals demonstrate higher electrical resistivity;

(c) the depth of the boundary (interface) is controlled through the diffusion reaction;

(d) a graded seal behavior in physical properties is obtained;

(e) the thermal expansion varies less with a mixed alkali seal than with $Na_2O$ alone;

(f) lower sealing temperatures are possible, thereby resulting in less thermal deformation;

(g) good control of glass viscosity is possible via the alkali metal oxide mixing ratio $R_2O:Na_2O$; and (h) independent control of the coefficient of thermal expansion of the sealing glass is possible through variations in the total alkali metal oxide content thereof ($R_2O+Na_2O$).

I claim:

1. A sealing glass comprising, expressed in mole percent on the oxide basis as calculated from the batch, of about 3–30% $R_2O$ and 60–95% $B_2O_3$, wherein $R_2O$ consists of at least one alkali metal oxide selected from the group of $K_2O$, $Rb_2O$, and $Cs_2O$, the sum of $R_2O+B_2O_3$ constituting at least 70 mole percent of the total composition, sealed to a base glass containing at least 10% by weight of an alkali metal oxide having a smaller alkali metal than an alkali metal oxide in said sealing glass, said sealing glass having a softening point below the annealing point of the glass to be sealed and a coefficient of thermal expansion closely compatible with that of the base glass.

2. A sealing glass according to claim 1 also containing at least one member of the group consisting of up to 20% $Na_2O$, up to 5% of alkaline earth metal oxides, up to 10% $SiO_2$, up to 5% Cl, and up to 5% F.

3. A sealing glass according to claim 2 wherein said sealing glass has a softening point below 450° C., the maximum $R_2O$ content is about 20%, and said base glass has a composition within the $Na_2O-B_2O_3$ system used as a membrane in sodium sulfur batteries.

4. A sealing glass according to claim 3 wherein said sealing glass consists essentially, expressed in mole percent on the oxide basis, of about 4–9.5% $R_2O$ and 87.3–91.1% $B_2O_3$.

5. A sealing glass according to claim 1 wherein $Al_2O_3$ is substituted for up to one-half the $B_2O_3$ content on a molar basis.

6. A sealing glass according to claim 1 wherein said base glass is a conventional soda lime glass.

* * * * *